(12) United States Patent
Lu et al.

(10) Patent No.: US 8,363,327 B2
(45) Date of Patent: Jan. 29, 2013

(54) PROJECTION LENS

(75) Inventors: Yi-Tien Lu, Hsin-Chu (TW); Jung-Yao Chen, Hsin-Chu (TW); Yu-Tsung Lee, Hsin-Chu (TW)

(73) Assignee: Young Optics Inc., Hsin-Chu (TW)

( * ) Notice: Subject to any disclaimer, the term of this patent is extended or adjusted under 35 U.S.C. 154(b) by 108 days.

(21) Appl. No.: 12/910,316

(22) Filed: Oct. 22, 2010

(65) Prior Publication Data

US 2011/0128636 A1 Jun. 2, 2011

(30) Foreign Application Priority Data

Nov. 27, 2009 (TW) .............................. 98140581 A

(51) Int. Cl.
*G02B 9/00* (2006.01)
*G02B 13/18* (2006.01)

(52) U.S. Cl. ........ 359/649; 359/650; 359/651; 359/715; 359/716

(58) Field of Classification Search .......... 359/649–651, 359/715, 716
See application file for complete search history.

(56) References Cited

U.S. PATENT DOCUMENTS

| | | | |
|---|---|---|---|
| 4,993,814 A | 2/1991 | Hata | |
| 5,233,474 A | 8/1993 | Hirakawa | |
| 5,251,073 A | 10/1993 | Schauss | |
| 5,796,528 A | 8/1998 | Mihara | |
| 6,747,816 B2 | 6/2004 | Sato | |
| 7,911,716 B1 * | 3/2011 | Lu et al. | 359/785 |
| 2003/0161050 A1 | 8/2003 | Sato et al. | |
| 2008/0266678 A1 | 10/2008 | Tang | |

* cited by examiner

*Primary Examiner* — William Choi
(74) *Attorney, Agent, or Firm* — WPAT PC; Justin King

(57) ABSTRACT

A projection lens includes a first lens group, a second lens group, and a third lens group. The first lens group is composed of a first lens. The first lens has a concave surface and a convex surface, and the concave surface of the first lens faces a reducing side of the projection lens. The second lens group has positive refractive power, and includes a second lens having positive refractive power and a third lens having negative refractive power. The second lens is a biconvex lens, and the third lens has a concave lens facing the reducing side. The third lens group is composed of a fourth lens, and the fourth lens has a convex surface facing a magnifying side of the projection lens. The first lens group, the second lens group, and the third lens group include at least two aspheric lenses.

18 Claims, 14 Drawing Sheets

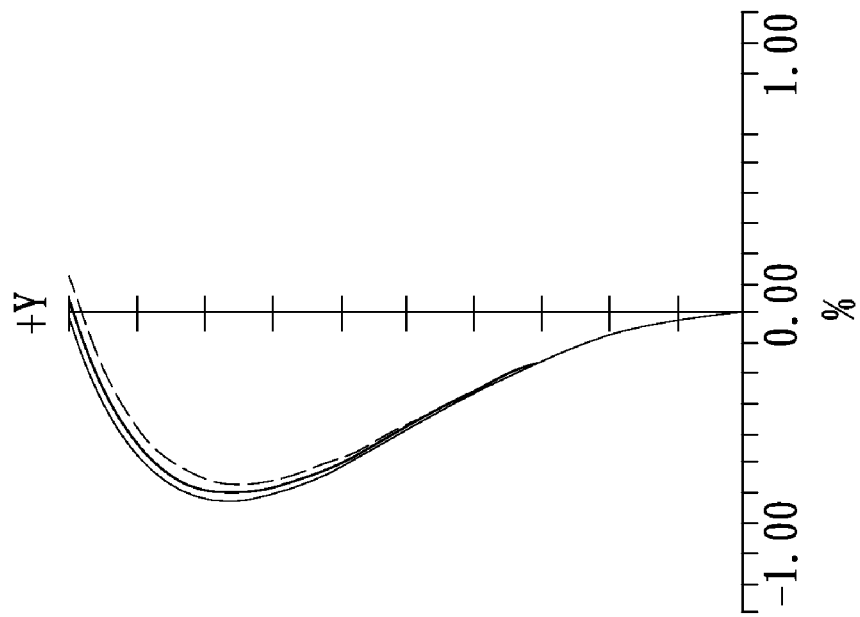
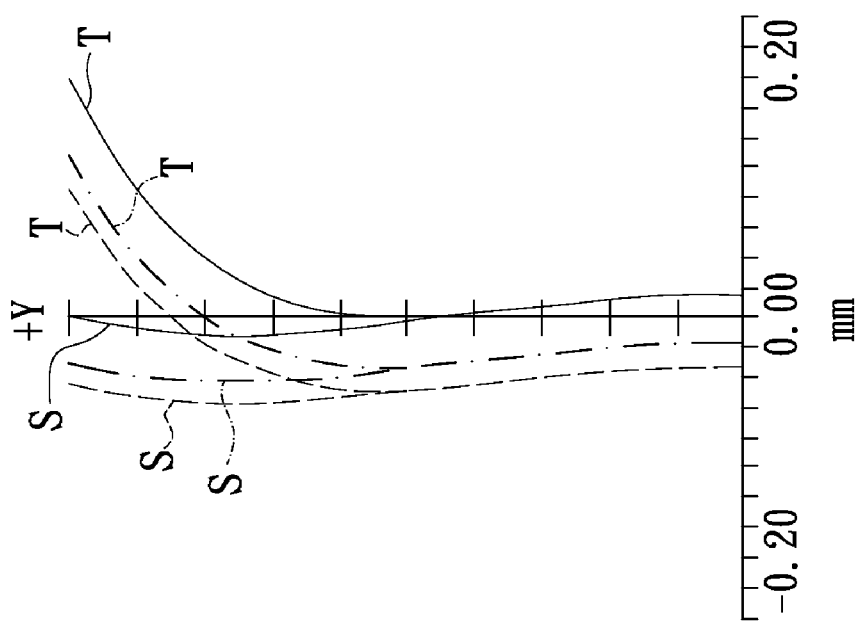

PROJECTION LENS

CROSS-REFERENCE TO RELATED APPLICATIONS

This application is based upon and claims the benefit of priority from the prior Taiwan Patent Application No. 098140581, filed Nov. 27, 2009, the entire contents of which are incorporated herein by reference.

BACKGROUND

1. Field of the Invention

The invention relates to a lens, and more particularly to a projection lens.

2. Description of the Related Art

Various lenses are disclosed in U.S. Pat. No. 4,993,814, U.S. Pat. No. 5,233,474, U.S. Pat. No. 5,796,528, U.S. Pat. No. 5,251,073, U.S. Pat. No. 6,747,816, US publication No. 2008/0266678 and US publication No. 2003/0161050. However, a projection lens applied to a projection apparatus may have high imaging quality. In general, a frame projected by the projection lens may satisfy multiple conditions such as low distortion aberration, high resolution, high contrast, and high uniformity, etc. Furthermore, for projecting a larger frame in a shorter projection distance, the projection lens may have a wide field of view (FOV) and low keystone aberration. Moreover, for increasing light utility efficiency and brightness uniformity of the projected frame, a telecentric angle, that is a maximum angle of a chief ray at a reducing side related to an optical axis of the projection lens, may be small enough to enable the chief ray to be substantially parallel with the optical axis.

It needs to overcome multiple difficulties to design a projection lens which satisfies the above-mentioned conditions. For example, for reducing the distortion aberration, the FOV may be reduced and numbers of the lenses of the projection lens may be increased. For achieving features of large FOV and small telecentric angle, a total length of the projection lens and sizes of the lenses would be increased. In conventional technique, a projection lens usually includes at least six lenses to achieve features of effective focal length being about 10 mm and imaging quality satisfying the above-mentioned conditions. Therefore, the conventional projection lens can not achieve a compact size and low cost.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF SUMMARY

The present invention provides a projection lens to achieve at least one of advantages of a compact size, low cost and high imaging quality.

To achieve at least one of the above-mentioned advantages, an embodiment of the present invention provides a projection lens including a first lens group, a second lens group, and a third lens group. The first lens group is composed of a first lens, and the first lens has a concave surface and a convex surface. The convex surface faces a reducing side of the projection lens. The second lens group has positive refractive power, and includes a second lens having positive refractive power and a third lens having negative refractive power. The second lens is located between the first lens and the third lens. The second lens is a biconvex lens, and the third lens has a concave surface facing the reducing side. The third lens group is composed of a fourth lens having positive refractive power, and the third lens is located between the second lens and the fourth lens. The fourth lens has a convex surface facing a magnifying side of the projection lens. The first lens group, the second lens group, and the third lens group include at least two aspheric lenses.

In an embodiment of the invention, the projection lens further includes an aperture stop disposed between the first lens and the second lens.

In an embodiment of the invention, the first lens group, the second lens group, and the aperture stop constitute a simultaneous focus group, and the third lens group is fixed.

In an embodiment of the invention, R6 represents a radius of curvature of a surface of the third lens facing the magnifying side, R7 represents a radius of curvature of the concave surface of the third lens facing the reducing side, and the projection lens satisfies an inequality of $0.7 \leq (|R6|+R7)/(|R6|-R7) \leq 2$.

In an embodiment of the invention, an imaging surface is located at the reducing side of the projection lens, D represents a distance from a center of the concave surface of the first lens to the imaging surface, F represents an effective focal length of the projection lens, and the projection lens satisfies an inequality of $1 \leq D/F \leq 2.5$.

In an embodiment of the invention, $F_{G1}$ represents an effective focal length of the first lens group, $F_{L2}$ represents an effective focal length of the second lens, and the projection lens satisfies an inequality of $1.8 \leq |F_{G1}|/F_{L2} \leq 11$.

In an embodiment of the invention, R7 represents a radius of curvature of the concave surface of the third lens facing the reducing side, F represents an effective focal length of the projection lens, and the projection lens satisfies an inequality of $0.2 \leq R7/F \leq 1$.

In an embodiment of the invention, $F_{G1}$ represents an effective focal length of the first lens group, F represents an effective focal length of the projection lens, and the projection lens satisfies an inequality of $1.5 \leq |F_{G1}|/F \leq 8$.

In an embodiment of the invention, $F_{G2}$ represents an effective focal length of the second lens group, $F_{G3}$ represents an effective focal length of the third lens group, and the projection lens satisfies an inequality of $0.2 \leq F_{G2}/F_{G3} \leq 1.8$.

In an embodiment of the invention, $F_{G3}$ represents an effective focal length of the third lens group, F represents an effective focal length of the projection lens, and the projection lens satisfies an inequality of $0.8 \leq F_{G3}/F \leq 2$.

In an embodiment of the invention, the second lens group further includes a fifth lens having positive refractive power, and the fifth lens is disposed between the second lens and the third lens.

In an embodiment of the invention, the fifth lens is a meniscus lens having a convex surface facing the magnifying side.

In an embodiment of the invention, $F_{G1}$ represents an effective focal length of the first lens group. $F_{L25}$ represents an effective focal length of a combination of the second lens and the fifth lens, and the projection lens satisfies an inequality of $1.8 \leq |F_{G1}|/F_{L25} \leq 11$.

In an embodiment of the invention, the first lens and the fifth lens are aspheric lenses.

In an embodiment of the invention, the first lens and the second lens are aspheric lenses.

In an embodiment of the invention, the first lens and the third lens are aspheric lenses.

In an embodiment of the invention, the first lens has negative refractive power.

In an embodiment of the invention, the first lens is adapted to let light beams passing through the first lens deviate from an optical axis of the projection lens.

In an embodiment of the invention, the first lens has negative refractive power.

The embodiment of the present invention has at least one of the following advantages. The projection lens of the embodiment of the present invention includes at least two aspheric lenses, so the projection lens may use four lenses to achieve high imaging quality. Moreover, the projection lens of the embodiment of the present invention may achieve a compact size and low cost due to using fewer lenses.

Other objectives, features and advantages of the present invention will be further understood from the further technology features disclosed by the embodiments of the invention wherein there are shown and described preferred embodiments of this invention, simply by way of illustration of modes best suited to carry out the invention.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 3B is a diagram of field curvature of the projection lens of the second embodiment of the present invention.

FIG. 3C is a diagram of distortion of the projection lens of the second embodiment of the present invention.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
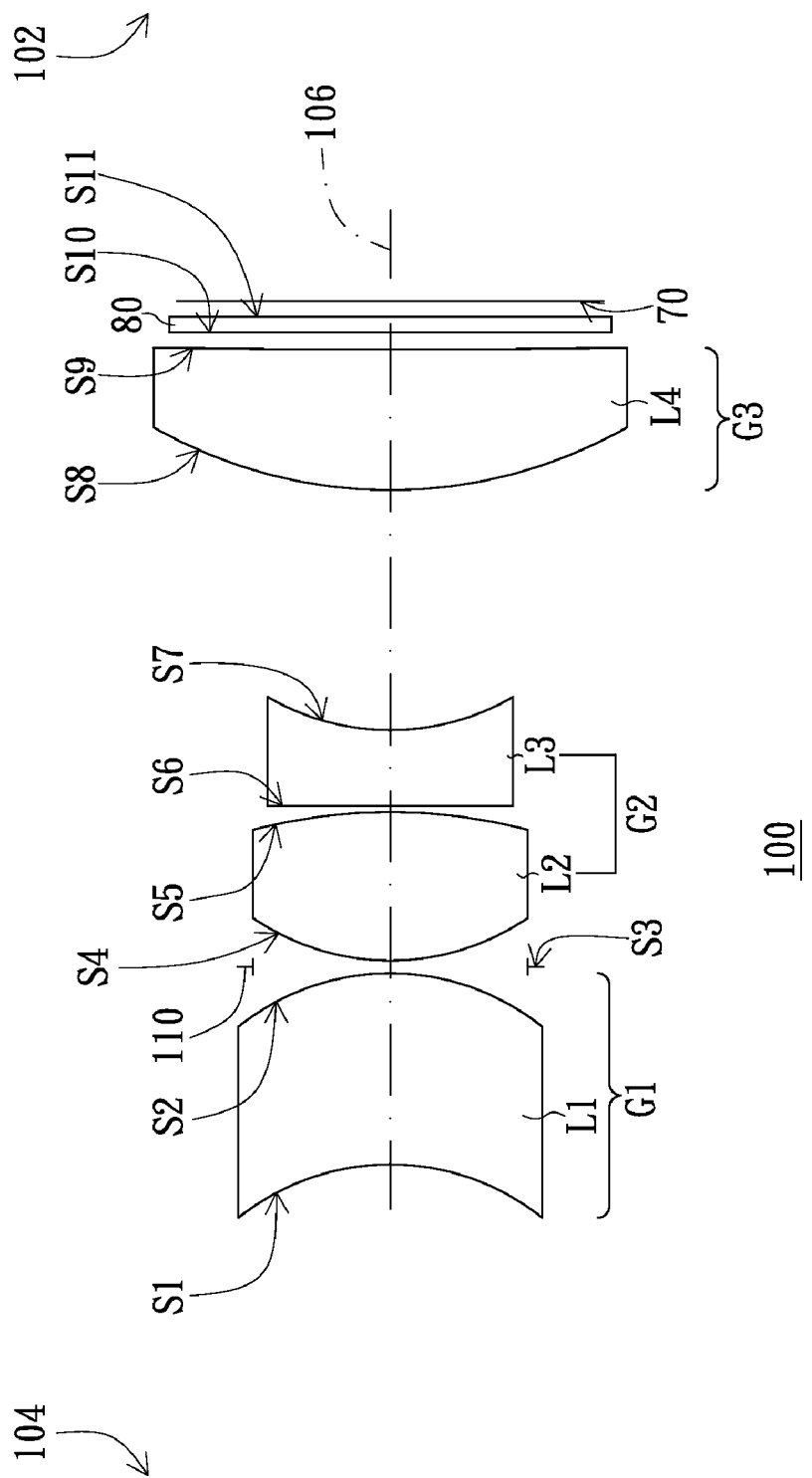
FIG. 1 is a schematic view of a projection lens according to an embodiment of the present invention.

Referring to FIG. 1, a projection lens 100 of the present embodiment is a fixed focus lens and is applied to, but not limited to, a telecentric system. In another embodiment, the projection lens 100 may be applied to a non-telecentric system. The projection lens 100 includes a first lens group G1, a second lens group G2, and a third lens group G3. The first lens group G1 is composed of a first lens L1, and the first lens L1 has a concave surface (i.e. a surface S1) and a convex surface (i.e. a surface S2). That is, the first lens L1 is a negative meniscus lens. The convex surface S2 of the first lens L1 faces a reducing side 102 of the projection lens 100. Moreover, the second lens group G2 has positive refractive power, and includes a second lens L2 having positive refractive power and a third lens L3 having negative refractive power. The second lens L2 is located between the first lens L1 and the third lens L3. The second lens L2 is a biconvex lens, and the third lens L3 has a concave surface (i.e. a surface S7) facing the reducing side 102. Furthermore, the third lens group G3 is composed of a fourth lens L4 having positive refractive power. The third lens L3 is located between the second lens L2 and the fourth lens L4, and the fourth lens L4 has a convex surface (i.e. a surface S8) facing a magnifying side 104 of the projection lens 100. The first lens group G1, the second lens group G2, and the third lens group G3 include at least two aspheric lenses. In other words, at least two of the lenses of the first lens group G1, the second lens group G2, and the third lens group G3 are aspheric lenses.

A frame projected by the projection lens 100 is projected to the magnifying side 104, and a light valve such as a digital micro-mirror device (DMD) is located at the reducing side 102. The reducing side 102 has an imaging surface 70. In the present embodiment, an active surface of the light valve is located at the imaging surface 70. Moreover, the projection lens 100 may further include an aperture stop 110, and the aperture stop 110 is disposed between the first lens L1 and the second lens L2. The first lens group G1, the second lens group G2, and the aperture stop 110 constitute a simultaneous focus group, and the third lens group G3 is fixed. In other words, when focusing is performed by the projection lens 100, the first lens group G1, the second lens group G2, and the aperture stop 110 are together moved toward the reducing side 102 or the magnifying side 104, while the third lens group G3 is fixed.

In the present embodiment, at least two aspheric lenses are used to correct aberration, so the projection lens 100 may use four lenses to achieve high imaging quality. Moreover, the projection lens 100 may achieve a compact size and low cost due to using fewer lenses. Such that, the projection lens 100 may be applied to a small sized portable electronic product such as a mobile phone.

A lens capable of letting most of the light beams deviate from an optical axis 106 may be selected to be the first lens L1. Such that, the first lens L1 is adapted to let the light beams passing through the first lens L1 deviate from the optical axis 106 of the projection lens 100, and thereby the projection lens 100 may achieve a wide field of view (FOV). In another embodiment, the first lens L1 has, for example, negative refractive power. Further, a surface S1 of the first lens L1 facing the magnifying side 104 may be designed to be a concave surface so as to reduce a size of the first lens L1. The second lens L2 may be designed to have higher refractive power so as to correct aberration caused by the first lens L1. The refractive power of third lens L3 may be designed to be negative so as to correct residual aberration of the first lens L1 and the second lens L2 and off-axis (i.e. the optical axis 106 of the projection lens 100) aberration. The refractive power of the third lens group G3 may be designed to be positive (i.e. the refractive power of the fourth lens L4 may be designed to be positive) so as to enable the projection lens 100 to be applied to the telecentric system. Furthermore, the refractive power of the third lens group G3 may be designed to be positive, so the second lens group G2 may be designed to include a lens having positive refractive power and a lens having negative refractive power so as to correct aberration. The surface S7 of the third lens L3 facing the reducing side 102 may be designed to be the concave surface so as to reduce a size of the third lens L3 and increase a larger interval between the third lens L3 and the fourth lens L4. Such that, other element such as a reflective mirror may be disposed between the third lens L3 and the fourth lens L4.

To further improve the imaging quality of the projection lens 100, the projection lens 100 may be designed to satisfy at least one of the following inequalities (1)-(5):

$$0.7 \leq (|R6|+R7)/(|R6|-R7) \leq 2 \qquad \text{inequality (1)}$$

$$1.8 \leq |F_{G1}|/F_{L2} \leq 11 \qquad \text{inequality (2)}$$

$$0.2 \leq R7/F \leq 1 \qquad \text{inequality (3)}$$

$$1.5 \leq |F_{G1}|/F \leq 8 \qquad \text{inequality (4)}$$

$$0.2 \leq F_{G2}/F_{G3} \leq 1.8 \qquad \text{inequality (5)}$$

wherein R6 represents a radius of curvature of a surface S6 of the third lens L3 facing the magnifying side 104. R7 represents a radius of curvature of the concave surface S7 of the third lens L3 facing the reducing side 102. $F_{G1}$ represents an effective focal length of the first lens group G1. $F_{L2}$ represents an effective focal length of the second lens L2. F represents an effective focal length of the projection lens 100. $F_{G2}$ represents an effective focal length of the second lens group G2. $F_{G3}$ represents an effective focal length of the third lens group G3.

When the projection lens 100 satisfies the inequality (1), an effect for correcting the off-axis aberration, especially for correcting field curvature and coma, is better. In inequality (1), when (|R6|+R7)/(|R6|−R7) is greater than 2, the concave surface S7 of the third lens L3 facing the reducing side 102 may result in greater aberration and to correct the off-axis aberration is difficult, especially the field curvature. On the other hand, when (|R6|+R7)/(|R6|−R7) is smaller than 0.7, the negative refractive power of the third lens L3 is weaker and to correct the aberration is difficult.

When the projection lens 100 satisfies the inequality (2), an effect for correcting the off-axis aberration and the aberration caused by the first lens L1 and the second lens L2 is better. In inequality (2), when is greater than 11, the positive refractive power of the second lens L2 is greater. This may reduce a size of the projection lens 100, but the aberration, especially the coma caused by the second lens L2 is greater and therefore the imaging quality of the projection lens 100 is reduced. On the other hand, when $|F_{G1}|/F_{L2}$ is smaller than 1.8, the positive refractive power of the second lens L2 is weaker, and therefore to correct the aberration caused by the first lens L1 and the off-axis aberration is difficult, especially the field curvature.

When the projection lens 100 satisfies the inequality (3), the imaging quality of high FOV is better and the surface S7 of the third lens L3 has a better effect for correcting spherical aberration caused by the second lens L2. In inequality (3), when R7/F is smaller than 0.2, the coma caused by the concave surface S7 of the third lens L3 facing the reducing side 102 may be increased, and therefore to achieve better imaging quality of high FOV is difficult. On the other hand, when R7/F is greater than 1, the coma caused by the concave surface S7 of the third lens L3 facing the reducing side 102 may be reduced, and therefore to correct the spherical aberration caused by the second lens L2 is difficult.

The projection lens 100 satisfying the inequality (4) may prevent a length of the projection lens 100 from being too long and improves a distortion aberration correcting effect for the of the first lens group G1. In inequality (4), when $|F_{G1}|/F$ is greater than 8, the refractive power of the first lens group G1 is smaller, and therefore the length of the projection lens 100 is difficult to prevent being too long. On the other hand, when $|F_{G1}|/F$ is smaller than 1.5, the negative refractive power of the first lens group G1 is greater, and therefore the distortion aberration is difficult to be corrected by the first lens group G1.

The projection lens 100 satisfying the inequality (5) may prevent the length of the projection lens 100 from being too long, and improves the aberration correcting effect. In inequality (5), when $F_{G2}/F_{G3}$ is greater than 1.8, the refractive power of the third lens group G3 relative to that the refractive power of the second lens group G2 is bigger, and therefore to correct the aberration is difficult, especially astigmatism. On the other hand, when $F_{G2}/F_{G3}$ is smaller than 0.2, the refractive power of the third lens group G3 relative to the refractive power of the second lens group G2 is smaller, and therefore the length of the projection lens 100 is difficult to prevent being too long.

To further prevent the length of the projection lens 100 from being too long or too short, the projection lens 100 may be designed to satisfy a following inequality (6):

$$1 \leq D/F \leq 2.5 \qquad \text{inequality (6)}$$

D represents a distance from a center of the concave surface S1 of the first lens L1 to the imaging surface 70, and F represents an effective focal length of the projection lens 100. The projection lens 100 satisfying the inequality (6) prevents the length of the projection lens 100 from being too long or too short. In inequality (6), when D/F is smaller than 1, an interval from the second lens group G2 to the third lens group G3 is smaller, and therefore space for, disposing other element such as the reflective mirror may be insufficient. On the other hand, when D/F is greater than 2.5, the projection lens 100 may have better imaging quality, but the length of the projection lens 100 is too long to achieve a compact size.

In order to let the projection lens 100 be applied to the telecentric system while the third lens L3 having a small size and let the interval between the second lens group G2 and the third lens group G3 be sufficient for disposing other element such as the reflective mirror, the projection lens 100 may be designed to satisfy a following inequality (7):

$$0.8 \leq F_{G3}/F \leq 2 \quad \text{inequality (7)}$$

In inequality (7), when $F_{G3}/F$ is greater than 2, the refractive power of the third lens group G3 is smaller, and therefore the projection lens 100 is difficult to be applied to the telecentric system unless the size of the third lens L3 is big enough. However, when the third lens L3 has a big size, the projection lens 100 may not achieve the compact size. On the other hand, when $F_{G3}/F$ is smaller than 0.8, the refractive power of the third lens group G3 is greater, and therefore the interval between the second lens group G2 and the third lens group G3 is smaller. Such that, the space between the second lens group G2 and the third lens group G3 may be insufficient for disposing other element such as the reflective mirror.

Detail data of three embodiments of the projection lens 100 will be shown bellow. In Table 1, Table 3, and Table 5, the interval means the distance from the surface N to the surface N+1 in the optical axis 106, wherein "N" represents the surface number. The surfaces S10 and S11 are two surfaces of a cover glass 80, and the interval of the surface S11 means the distance from the surface S11 to the imaging surface 70. The invention is not limited by the data shown in Table 1 to Table 6, one skilled in the art could properly modify the parameters and the design of the embodiment after reading the specification of the invention, however it is within the scope and spirit of the invention disclosed herein.

In the first embodiment, the first lens L1 and the second lens L2 are aspheric lenses. Detail data of the first embodiment will be shown in Table 1 and Table 2.

TABLE 1

| Surface number | Radius of curvature (mm) | Interval (mm) | Refractive index | Abbe's number | Note |
|---|---|---|---|---|---|
| S1 | −3.898908 | 3.278817 | 1.830506 | 30.74596 | L1 |
| S2 | −7.000298 | 0.1 | | | |
| S3 | Infinity | 0.1 | | | Aperture stop |
| S4 | 4.263075 | 3.064674 | 1.743267 | 50.89749 | L2 |
| S5 | −13.06377 | 0.19138 | | | |
| S6 | −109.5523 | 1.119564 | 1.784603 | 26.51651 | L3 |
| S7 | 4.023385 | 6.941096 | | | |
| S8 | 7.621422 | 3.1885 | 1.751427 | 74 | L4 |
| S9 | 28.76166 | 0.38813 | | | |
| S10 | Infinity | 0.4 | 1.508469 | 61.1878 | Cover glass |
| S11 | Infinity | 0.306 | | | |

In the first embodiment, the focal length of projection lens 100 is about 9.356 mm, the FOV (2ω) of the projection lens 100 is about 42 degrees, and the telecentric angle of the projection lens 100 is about 0.92 degrees. (|R6|+R7)/(|R6|−R7) is 1.076. $|F_{G1}|/F_{L2}$ is 4.358. R7/F is 0.43. $|F_{G1}|/F$ is 2.164. $F_{G2}/F_{G3}$ is 0.719. D/F is 2.039. $F_{G3}/F$ is 1.378. Moreover, the surfaces S1, S2, S4 and S5 are aspheric surfaces and satisfy a following equation:

$$Z(h) = \frac{h^2/r}{1 + \sqrt{1 - (1+k)(h^2/r^2)}} + C_2h^2 + C_4h^4 + C_6h^6 + C_8h^8 + C_{10}h^{10} + C_{12}h^{12} + \ldots$$

In the above equation. "Z(h)" represents a sag in a direction of the optical axis 106. "r" represents a radius of an osculating sphere, that is, the radiuses of curvature of the position near the optical axis 106 (for example, the radiuses of curvature of the surface S1 or S2 in Table 1). "k" represents a conic constant. "h" represents a height of the aspheric surface, that is, a height from a center of the aspheric lens to an edge of the aspheric lens. "$C_2$", "$C_4$", "$C_6$", "$C_8$", "$C_{10}$" and "$C_{12}$" etc. respectively represent aspheric coefficients. Values of k, $C_2$, $C_4$, $C_6$, $C_8$, $C_{10}$ and $C_{12}$ are shown in Table 2.

TABLE 2

| | Surface S1 | Surface S2 | Surface S4 | Surface S5 |
|---|---|---|---|---|
| K | 0.072164 | 0.921134 | −0.36246 | −46.0948 |
| $C_2$ | 0 | 0 | 0 | 0 |
| $C_4$ | 6.8281E−03 | 5.3368E−04 | −2.6431E−03 | −2.9246E−03 |
| $C_6$ | −4.1056E−04 | 1.1657E−04 | 1.2309E−04 | 1.7328E−04 |
| $C_8$ | 5.7267E−05 | −1.4307E−06 | −4.7108E−06 | 1.3165E−05 |
| $C_{10}$ | −3.1095E−06 | −1.8543E−07 | −3.5078E−07 | −2.9203E−06 |
| $C_{12}$ | 1.2275E−07 | 1.9921E−08 | 3.6732E−08 | 1.7089E−07 |

Figure 2A:
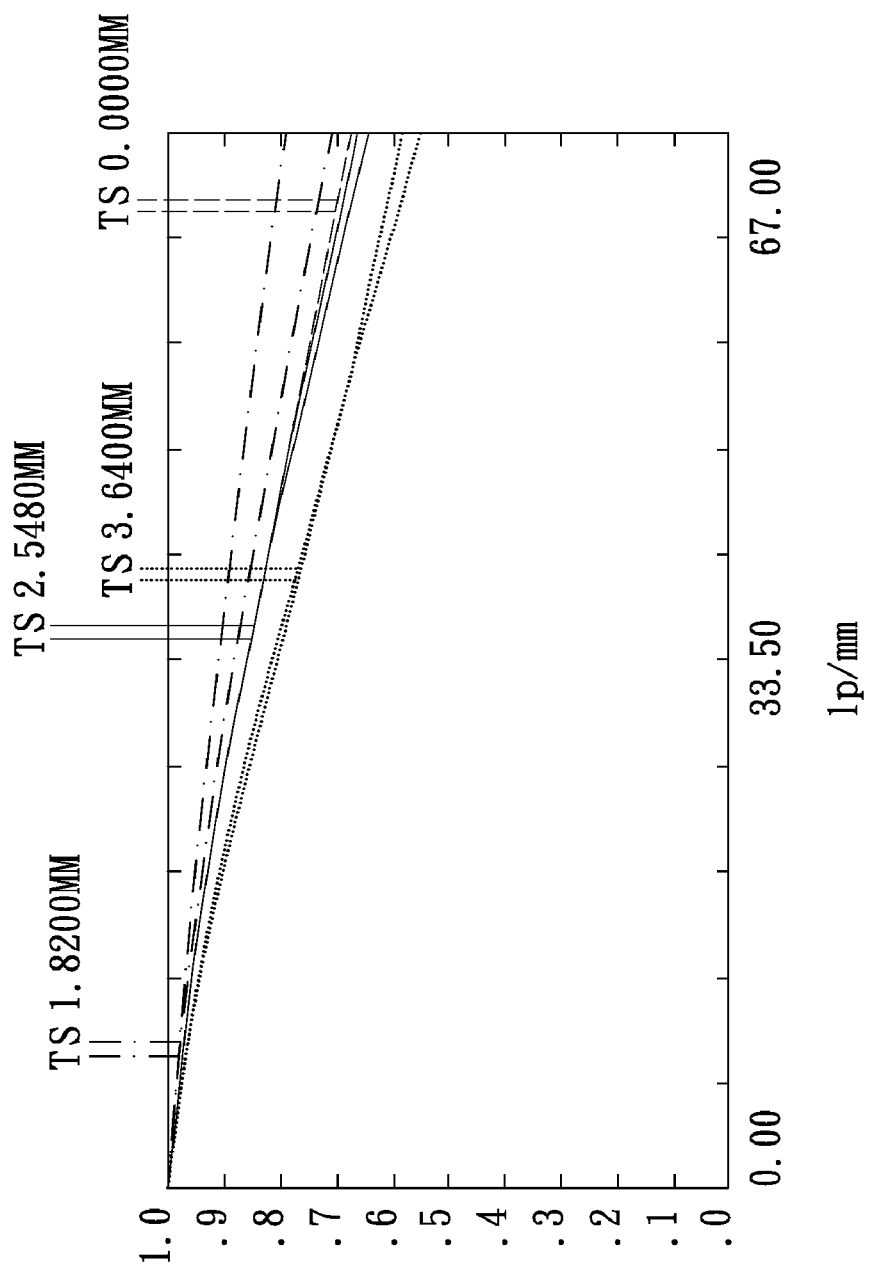
FIG. 2A shows a modulation transfer function (MTF) of the projection lens of the first embodiment of the present invention.
Figure 2C:
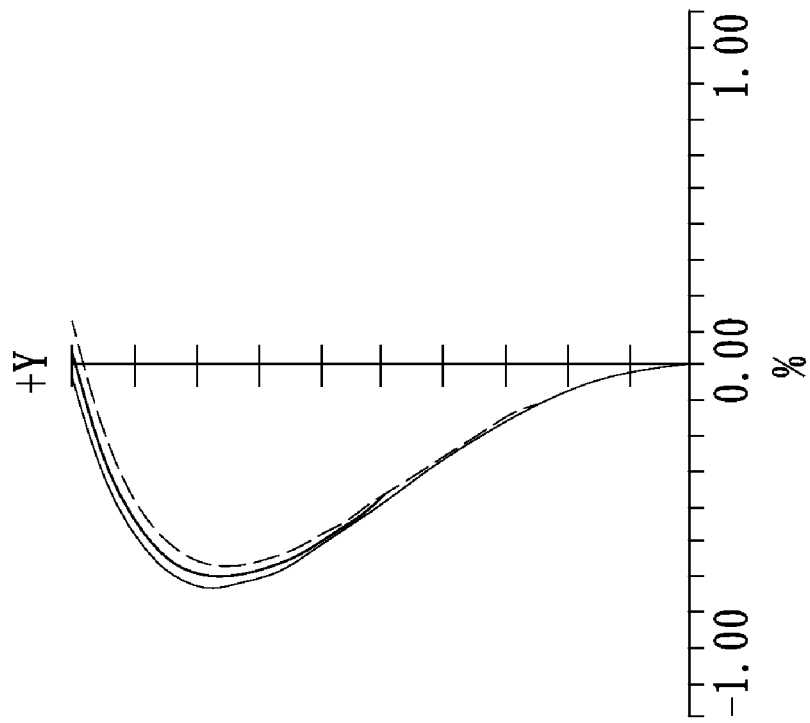
FIG. 2C is a diagram of distortion of the projection lens of the first embodiment of the present invention.
Figure 2B:
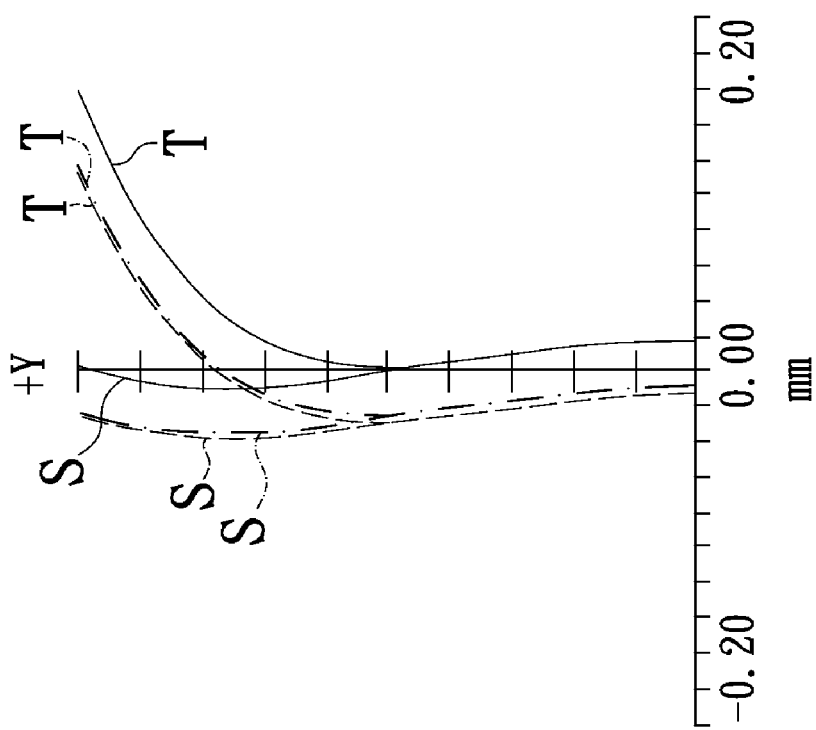
FIG. 2B is a diagram of field curvature of the projection lens of the first embodiment of the present invention.
Figure 2D:
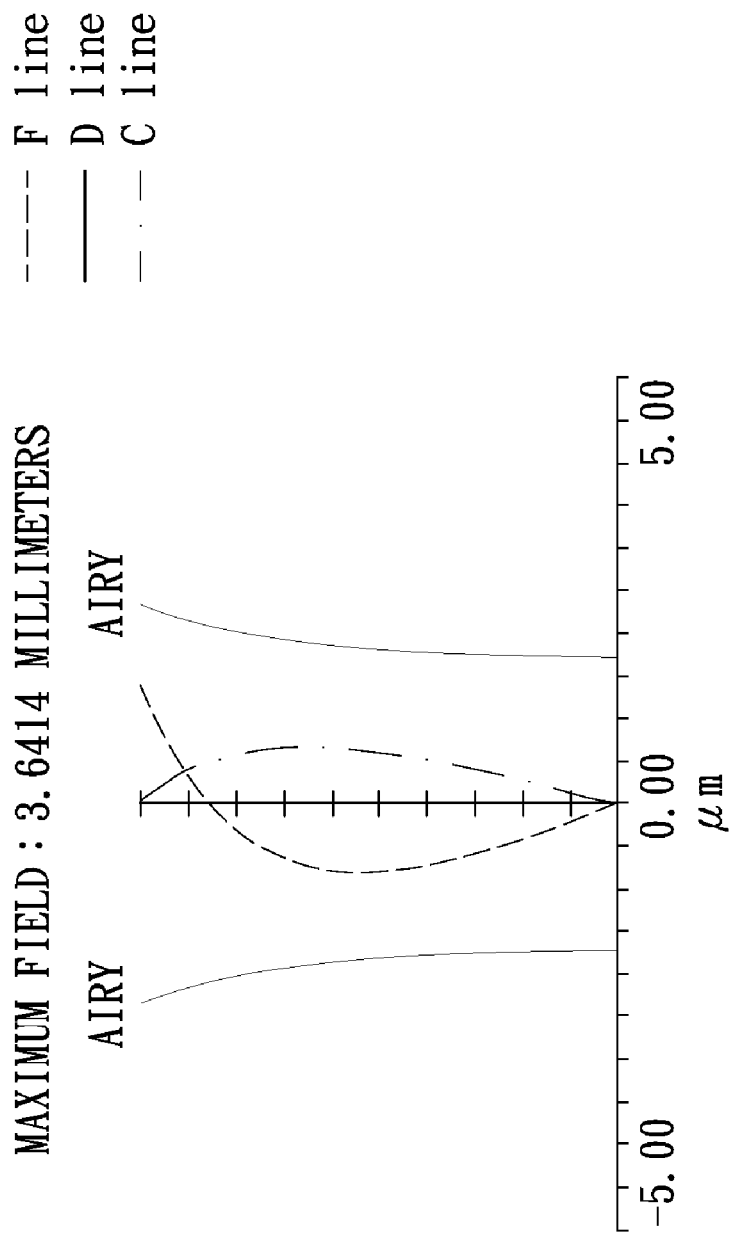
FIG. 2D is a diagram of lateral color of the projection lens of the first embodiment of the present invention.
Figure 3A:
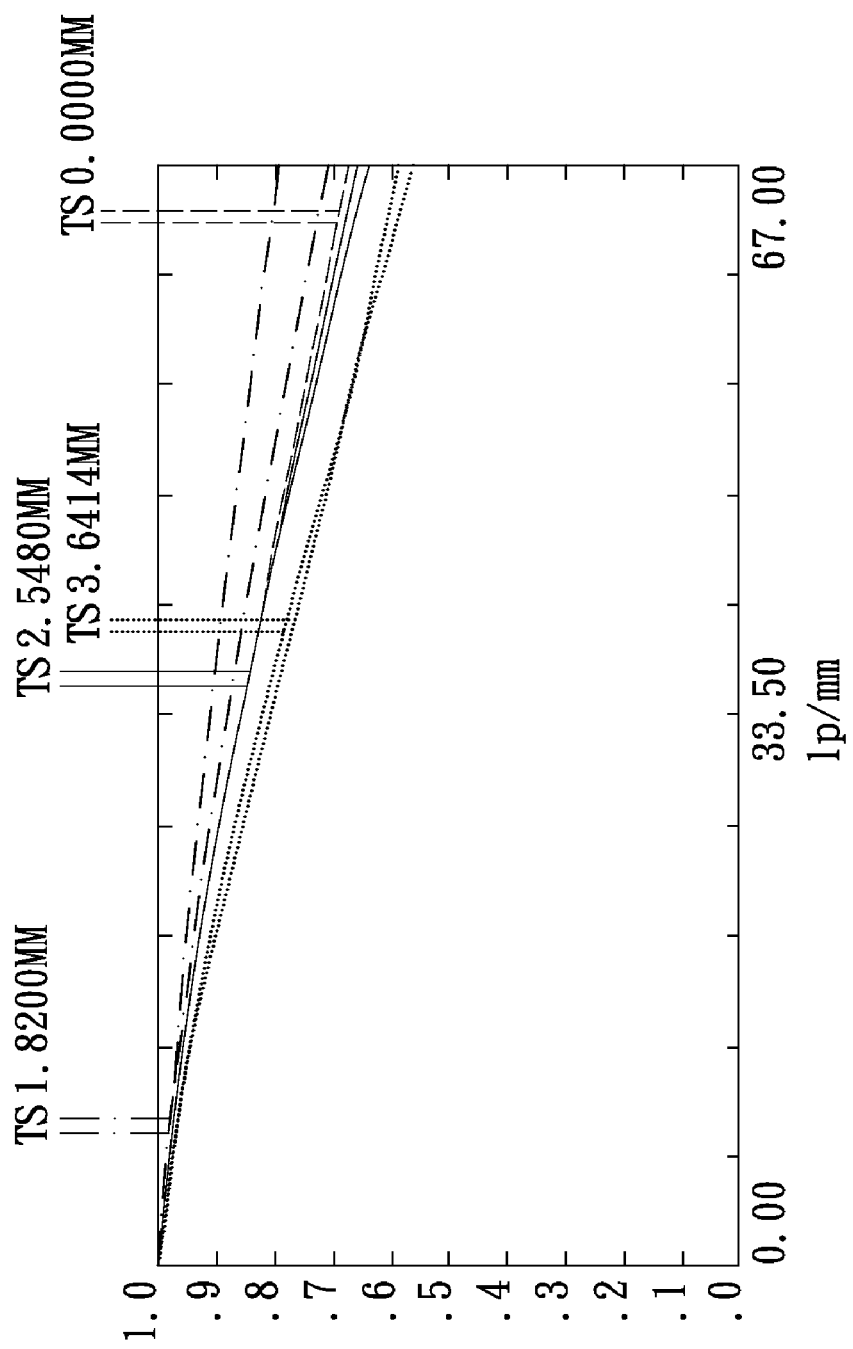
FIG. 3A shows a MTF of the projection lens of the second embodiment of the present invention.
Figure 3D:
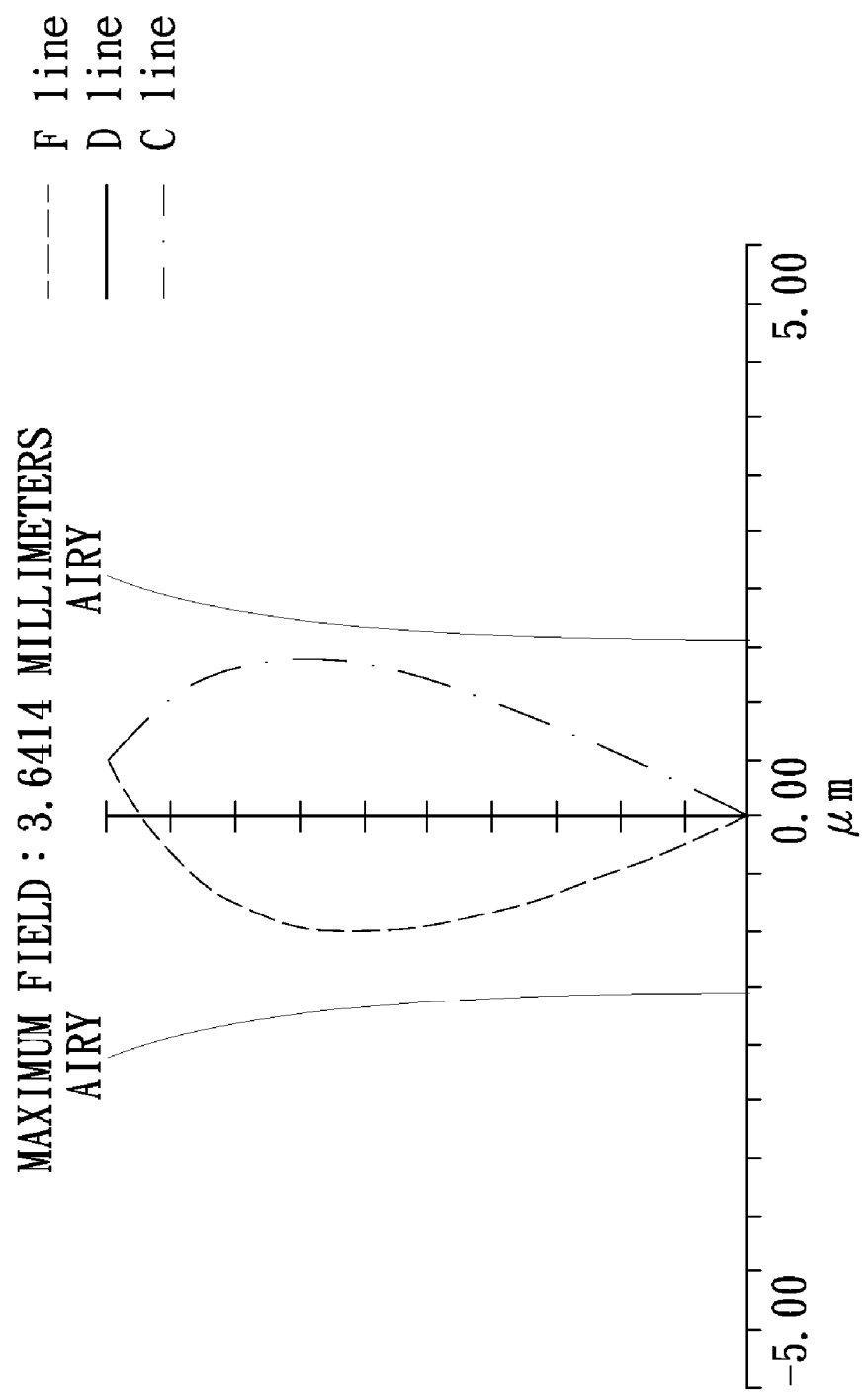
FIG. 3D is a diagram of lateral color of the projection lens of the second embodiment of the present invention.
Figure 4A:
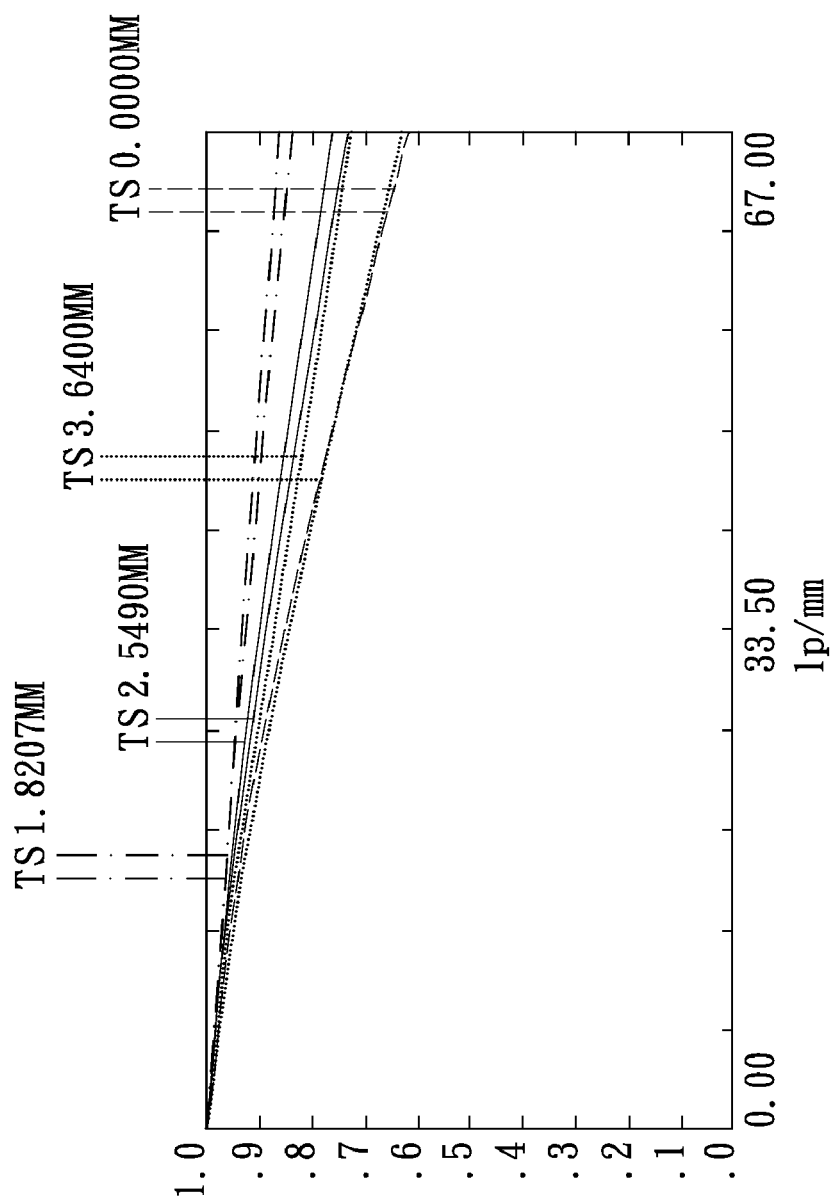
FIG. 4A shows a MTF of the projection lens of the third embodiment of the present invention.
Figure 4C:
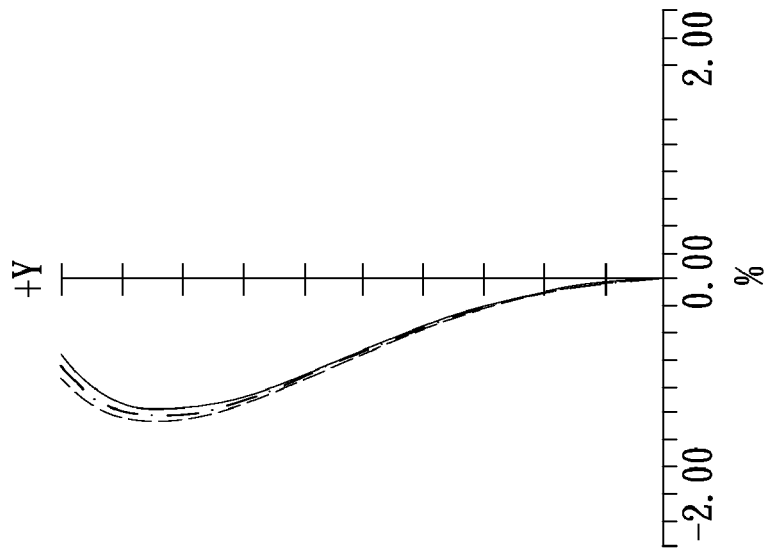
FIG. 4C is a diagram of distortion of the projection lens of the third embodiment of the present invention.
Figure 4B:
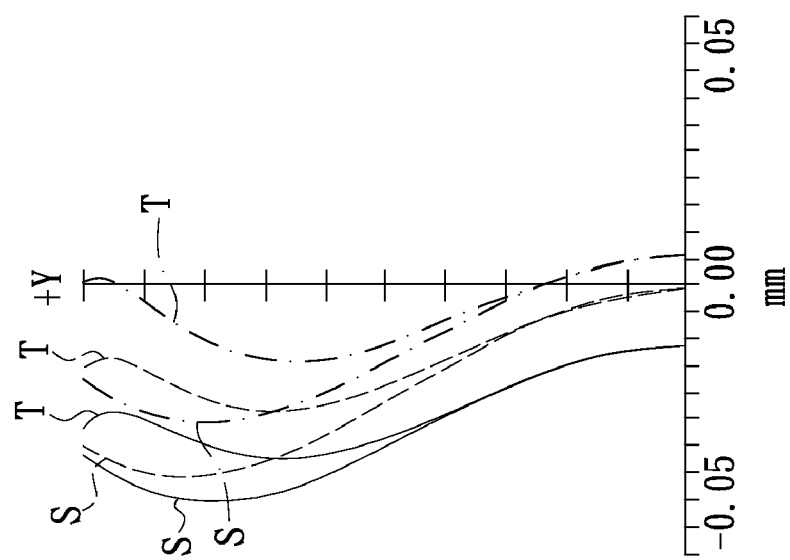
FIG. 4B is a diagram of field curvature of the projection lens of the third embodiment of the present invention.
Figure 4D:
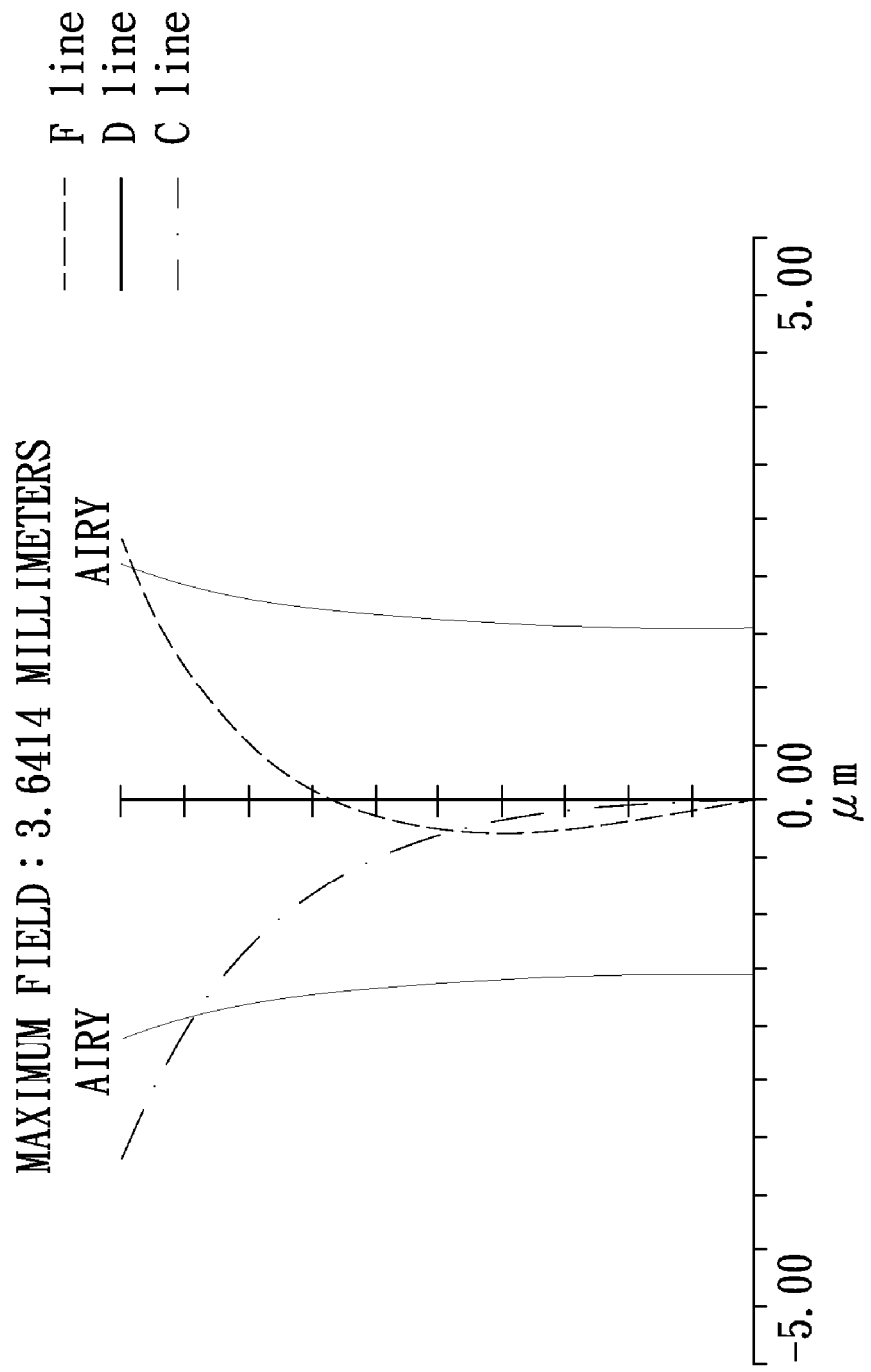
FIG. 4D is a diagram of lateral color of the projection lens of the third embodiment of the present invention.

Referring to FIGS. 2A to 2D, a traverse axis in FIG. 2A represents the spatial frequency in cycles per millimeter (1 p/mm), and a longitudinal axis in FIG. 2A represents the modulus of the optical transfer function (OTT).

Since the graphs shown in FIGS. 2A to 2D are respectively within standard ranges, they may prove the projection lens 100 of the first embodiment not only has the small telecentric angle so as to be applied to the telecentric system, but also has the compact size and lower cost in the condition of maintaining high imaging quality.

In the second embodiment, the first lens L1 and the third lens L3 are aspheric lenses. Detail data of the second embodiment will be shown in Table 3 and Table 4.

TABLE 3

| Surface number | Radius of curvature (mm) | Interval (mm) | Refractive index | Abbe's number | Note |
|---|---|---|---|---|---|
| S1 | −3.90269 | 3.242236 | 1.859169 | 32.95213 | L1 |
| S2 | −7.03663 | 0.1 | | | |
| S3 | Infinity | 0.1 | | | Aperture stop |
| S4 | 4.268778 | 3.033365 | 1.74222 | 52.62339 | L2 |
| S5 | −13.1316 | 0.190499 | | | |
| S6 | −102.441 | 1.102364 | 1.787382 | 25.20409 | L3 |
| S7 | 4.011923 | 6.867513 | | | |
| S8 | 7.496595 | 3.166384 | 1.810853 | 70.06474 | L4 |
| S9 | −100 | 0.301703 | | | |
| S10 | Infinity | 0.4 | 1.508469 | 61.1878 | Cover glass |
| S11 | Infinity | 0.306 | | | |

In the second embodiment, the focal length of the projection lens 100 is about 8.788 mm, the FOV of the projection lens 100 is about 44.18 degrees, and the telecentric angle of the projection lens 100 is about 0.89 degrees. (|R6|+R7)/(|R6|−R7) is 1.082. $|F_{G1}|/F_{L2}$ is 4.173. R7/F is 0.456. $|F_{G1}|/F$ is 2.211. $F_{G2}/F_{G3}$ is 1.101. D/F is 2.253. $F_{G3}/F$ is 0.987. Moreover, the surfaces S1, S2, S6 and S7 are aspheric surfaces, and detail data of the surfaces S1, S2, S6 and S7 will be shown in Table 4.

TABLE 4

|  | Surface S1 | Surface S2 | Surface S6 | Surface S7 |
|---|---|---|---|---|
| k | 0.075069 | 0.917105 | 0 | 0.078944 |
| $C_2$ | 0 | 0 | 0 | 0 |
| $C_4$ | 6.7939E−03 | 5.5984E−04 | −8.3460E−05 | 1.9749E−04 |
| $C_6$ | −4.1185E−04 | 1.2090E−04 | −1.8918E−05 | 4.8521E−05 |
| $C_8$ | 5.7151E−05 | −1.4041E−06 | −3.8677E−06 | 1.0772E−05 |
| $C_{10}$ | −2.9868E−06 | −1.8338E−07 | −7.4864E−07 | 2.4080E−06 |
| $C_{12}$ | 1.2256E−07 | 2.0026E−08 | −1.4306E−07 | 5.6505E−07 |

Referring to FIGS. 3A to 3D, since the graphs shown in FIGS. 3A to 3D are respectively within the standard ranges, they may prove the projection lens 100 of the second embodiment not only has the small telecentric angle so as to be applied to the telecentric system, but also has the compact size and lower cost in the condition of maintaining high imaging quality.

In the third embodiment, the first lens L1 and the third lens L3 are aspheric lenses. Detail data of the third embodiment will be shown in Table 5 and Table 6.

TABLE 5

| Surface number | Radius of curvature (mm) | Interval (mm) | Refractive index | Abbe's number | Note |
|---|---|---|---|---|---|
| S1 | −3.776516 | 3.482329 | 1.525279 | 55.95076 | L1 |
| S2 | −4.446563 | 0.1 |  |  |  |
| S3 | Infinity | 0.1 |  |  | Aperture stop |
| S4 | 6.00666 | 2.598185 | 1.772626 | 51.7087 | L2 |
| S5 | −25.4669 | 0.1 |  |  |  |
| S6 | 10.35014 | 0.960749 | 1.631919 | 23.41612 | L3 |
| S7 | 2.713581 | 7.12426 |  |  |  |
| S8 | 7.651979 | 3.166515 | 1.601346 | 39.54482 | L4 |
| S9 | 100 | 0.390549 |  |  |  |
| S10 | Infinity | 0.4 | 1.508469 | 61.1878 | Cover glass |
| S11 | Infinity | 0.306 |  |  |  |

In the third embodiment, the focal length of the projection lens 100 is about 9.788 mm, the FOV of the projection lens 100 is about 40.86 degrees, and the telecentric angle of the projection lens IOU is about 1 degree. (|R6|+R7)/(|R6|−R7) is 1.709. $|F_{G1}|/F_{L2}$ is 9.172. R7/F is 0.277. $|F_{G1}|/F$ is 6.072. $F_{G2}/F_{G3}$ is 1.698. D/F is 2.424. $F_{G3}/F$ is 1.377. Moreover, the surfaces S1, S2, S6 and S7 are aspheric surfaces, and detail data of the surfaces S1, S2, S6 and S7 will be shown in Table 6.

TABLE 6

|  | Surface S1 | Surface S2 | Surface S6 | Surface S7 |
|---|---|---|---|---|
| K | −0.10322 | 0.021622 | 2.851412 | −0.02162809 |
| $C_2$ | 0 | 0 | 0 | 0 |
| $C_4$ | 4.2786E−03 | 4.7757E−03 | −6.6591E−04 | −9.2097E−03 |
| $C_6$ | 5.2221E−05 | −1.3994E−04 | −6.6794E−04 | −6.4783E−04 |
| $C_8$ | −3.3462E−06 | 1.6883E−05 | 8.9464E−05 | 1.9084E−05 |
| $C_{10}$ | 6.4040E−07 | −1.1131E−06 | −5.1307E−06 | 8.4116E−06 |
| $C_{12}$ | 3.6550E−09 | 4.6044E−08 | 1.0167E−08 | −2.8232E−06 |

Referring to FIGS. 4A to 4D, since the graphs shown in FIGS. 4A to 4D are respectively within the standard ranges, they may prove the projection lens 100 of the third embodiment not only has the small telecentric angle so as to be applied to the telecentric system, but also has the compact size and lower cost in the condition of maintaining high imaging quality.

Figure 5:
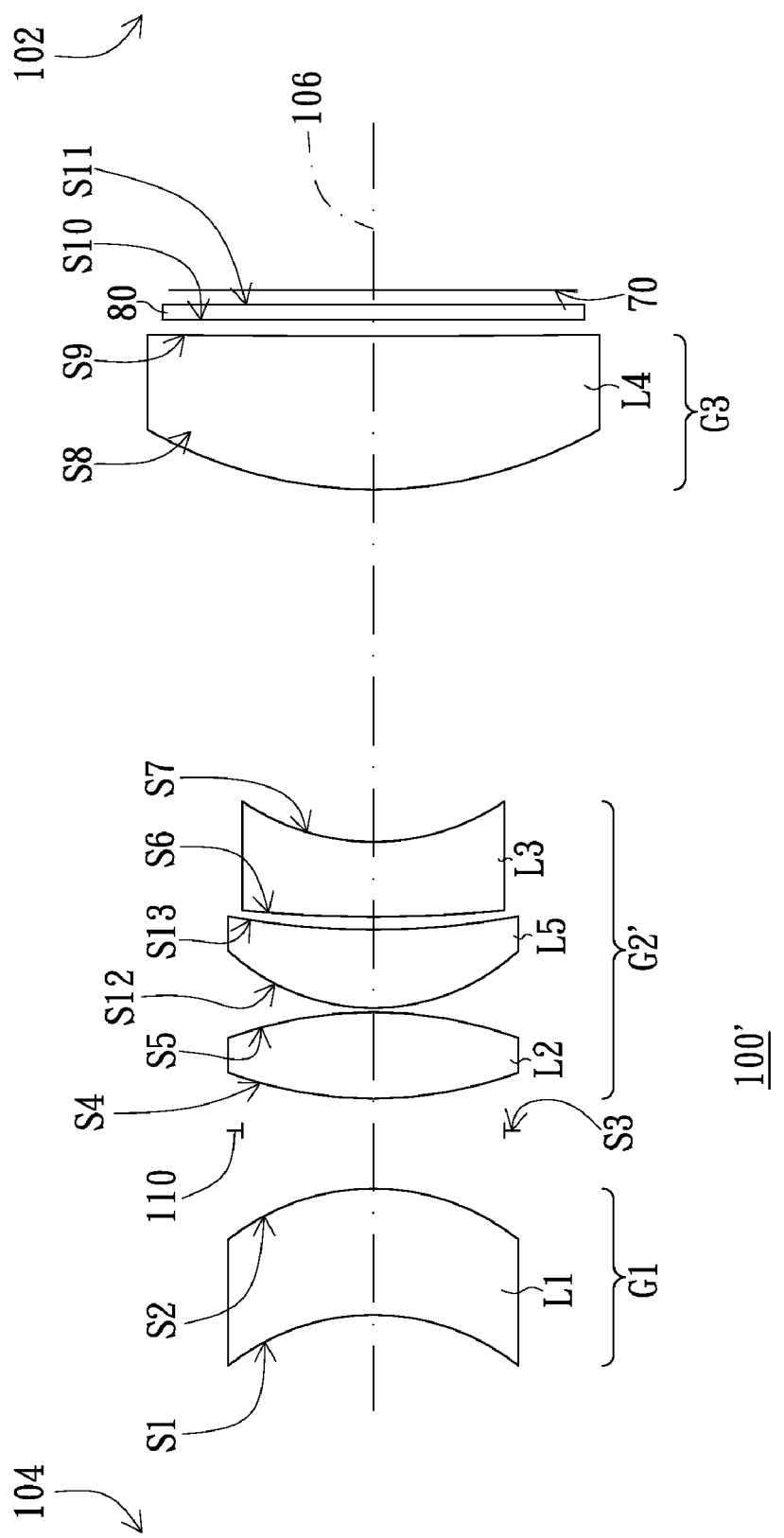
FIG. 5 is a schematic view of a projection lens according to another embodiment of the present invention.
Figure 6A:
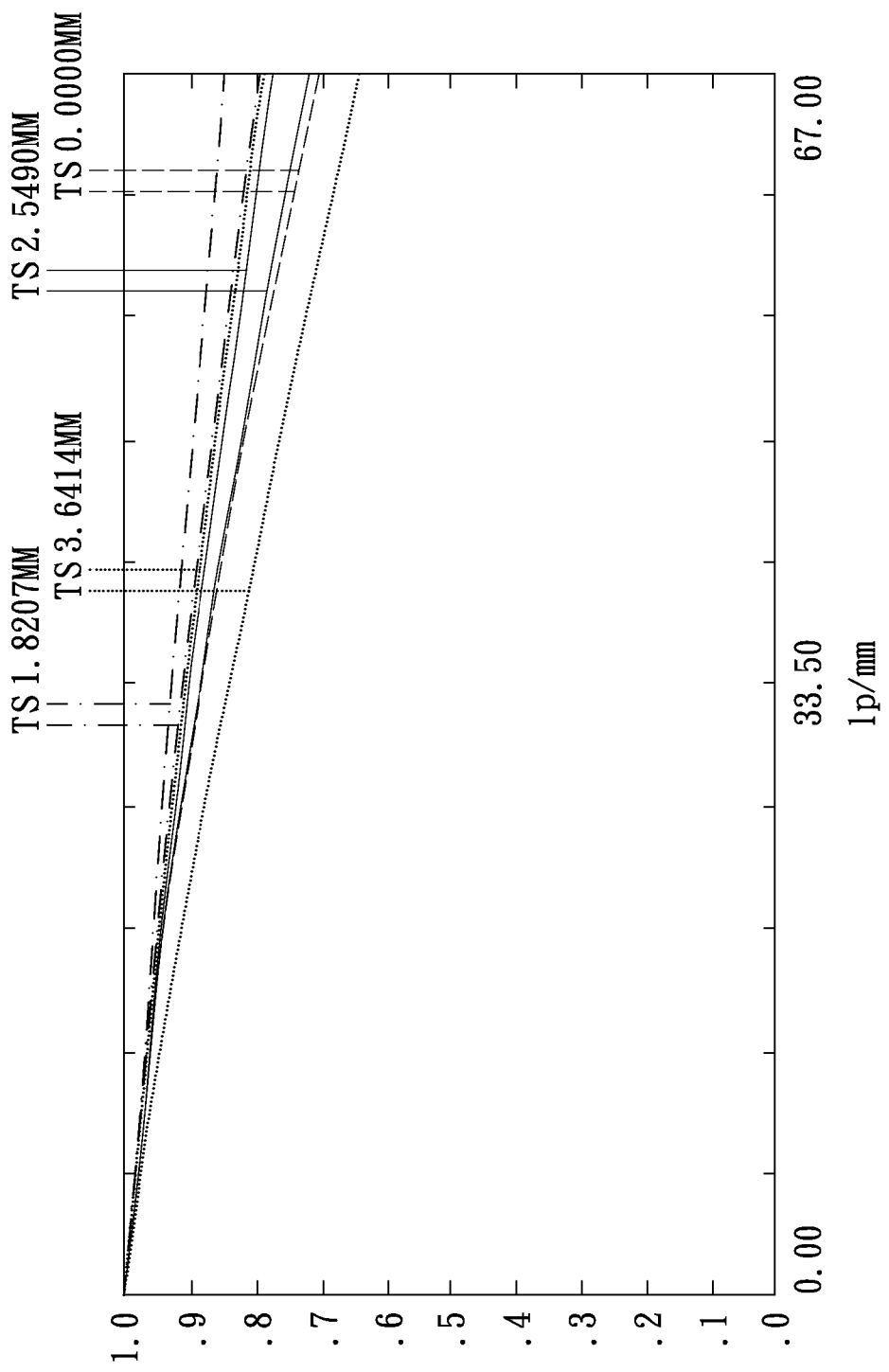
FIG. 6A shows a MTF of the projection lens of the fourth embodiment of the present invention.
Figure 6C:
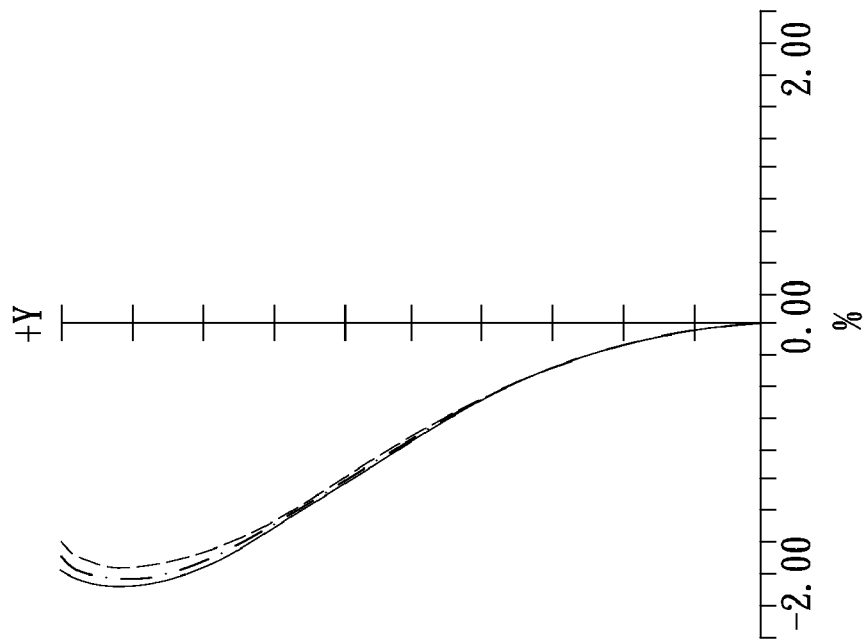
FIG. 6C is a diagram of distortion of the projection lens of the fourth embodiment of the present invention.
Figure 6B:
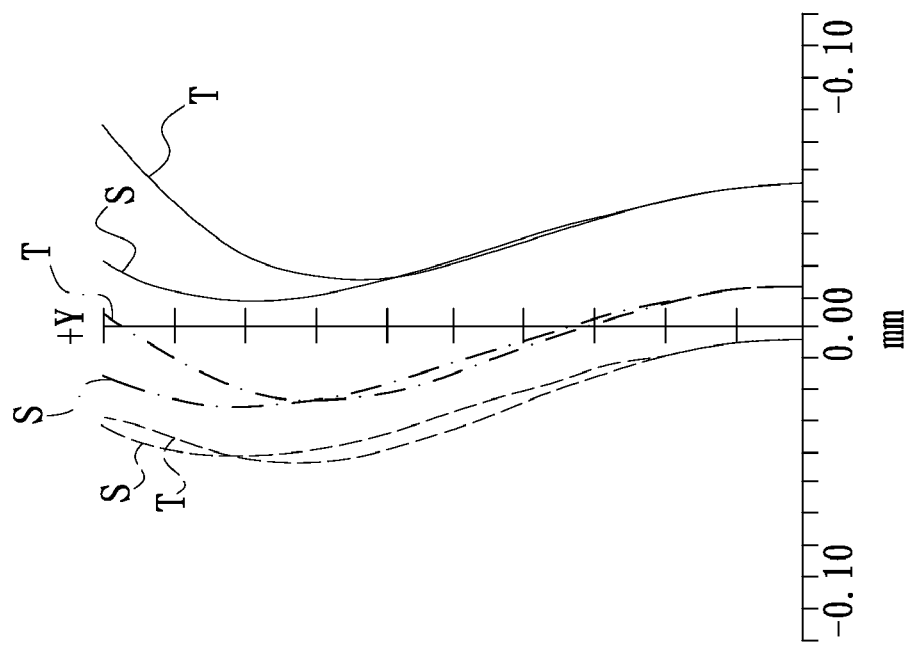
FIG. 6B is a diagram of field curvature of the projection lens of the fourth embodiment of the present invention.
Figure 6D:
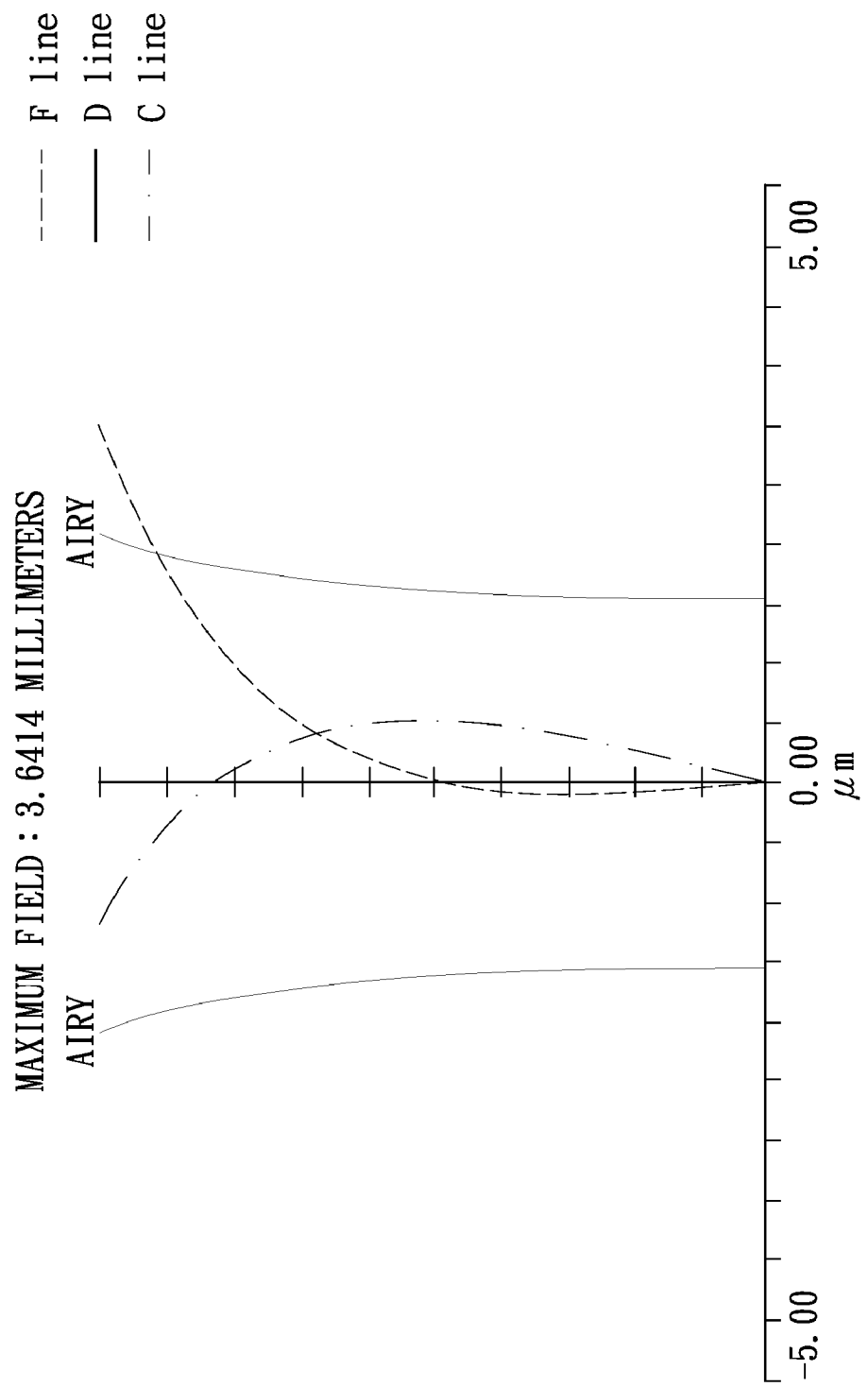
FIG. 6D is a diagram of lateral color of the projection lens of the fourth embodiment of the present invention.

Referring to FIG. 5, the projection lens 100' of the present embodiment is similar to the projection lens 100 of FIG. 1, and the difference is that the second lens group G2' of the projection lens 100' further includes a fifth lens L5 having positive refractive power. The fifth lens L5 is located between the second lens L2 and the third lens L3. The fifth lens L5 is, for example, a meniscus lens and has a convex surface (i.e. a surface S12) facing the magnifying side 104.

In the projection lens 100, since the second lens L2 used to correct the aberration caused by the first lens L1 has higher refractive power, the aberration caused by the second lens L2 is a little high so as to result in small manufacturing and assembling tolerance of the second lens L2. In view of this, the fifth lens L5 is added to the projection lens 100' of the embodiment so as to use the second lens L2 and the fifth lens L5 to correct the aberration caused by the first lens L1, thereby the above-mentioned disadvantages are eliminated. Such that, yield of the projection lens 100' may be increased and therefore the cost of the projection lens 100' may be reduced.

The main difference between the projection lens 100' of the present embodiment and the projection lens 100 is that the second lens L2 and the fifth lens L5 are used in the projection lens 100' to correct the aberration caused by the first lens L1, so the projection lens 100' may satisfy an inequality of $1.8 \leq |F_{G1}|/F_{25} \leq 11$ to further improve the effect for correcting the aberration. $F_{L25}$ mentioned above represents an effective focal length of a combination of the second lens L2 and the fifth lens L5.

Detail data of one embodiment of the projection lens 100' will be shown bellow. In the embodiment, the first lens L1 and the fifth lens L5 are aspheric lenses. Moreover, in Table 7, the interval means the distance from the surface N to the surface N+1 in the optical axis 106. "N" represents the surface number. The interval of the surface S5 means the distance from the surface S5 to the surface S12 in the optical axis 106, and the interval of the surface S13 means the distance from the surface S13 to the surface S6 in the optical axis 106. The surfaces S10 and S11 are two surfaces of the cover glass 80, and the interval of the surface S11 means the distance from the surface S11 to the imaging surface 70. The invention is not limited by the data shown in Table 7 and Table 8, one skilled in the art could properly modify the parameters and the design of the embodiment after reading the specification of the invention, however it is within the scope and spirit of the invention disclosed herein.

TABLE 7

| Surface number | Radius of curvature (mm) | Interval (mm) | Refractive index | Abbe's number | Note |
|---|---|---|---|---|---|
| S1 | −2.65806 | 2.622283 | 1.525279 | 55.95076 | L1 |
| S2 | −5.08597 | 0.1 |  |  |  |
| S3 | Infinity | 0.1 |  |  | Aperture stop |
| S4 | 10.95166 | 1.705105 | 1.697426 | 56.83646 | L2 |
| S5 | −16.0621 | 0.1 |  |  |  |
| S12 | 4.002811 | 1.594382 | 1.525279 | 55.95076 | L5 |
| S13 | 9.583605 | 0.223399 |  |  |  |
| S6 | 15.72755 | 1.006873 | 1.845613 | 24.188 | L3 |
| S7 | 4.192296 | 7.301892 |  |  |  |
| S8 | 7.563638 | 3.156196 | 1.563285 | 42.24884 | L4 |

TABLE 7-continued

| Surface number | Radius of curvature (mm) | Interval (mm) | Refractive index | Abbe's number | Note |
|---|---|---|---|---|---|
| S9 | 99.50797 | 0.380879 | | | |
| S10 | Infinity | 0.4 | 1.506903 | 63.1029 | Cover glass |
| S11 | Infinity | 0.306 | | | |

In the fourth embodiment, the focal length of the projection lens 100' is about 9.979 mm, the FOV of the projection lens 100' is about 42 degrees, and the telecentric angle of the projection lens 100' is about 0.998 degrees. $(|R6|+R7)/(|R6|-R7)$ is 1.727. $|F_{G1}|/F_{L25}$ is 3.181. R7/F is 0.42. $|F_{G1}|/F$ is 1.685. $F_{G2}/F_{G3}$ is 0.6. D/F is 1.904. $F_{G3}/F$ is 1.426. Moreover, the surfaces S1, S2, S12 and S13 are aspheric surfaces, and detail data of the surfaces S1, S2, S12 and S13 will be shown in Table 8.

TABLE 8

| | Surface S1 | Surface S2 | Surface S12 | Surface S13 |
|---|---|---|---|---|
| K | −1.74354 | −2.00361 | −0.58068 | −19.9984 |
| $C_2$ | 0 | 0 | 0 | 0 |
| $C_4$ | 4.4970E−04 | 1.6677E−03 | 3.4004E−04 | 8.0130E−04 |
| $C_6$ | 5.9283E−05 | −7.3787E−05 | −1.3671E−05 | 6.4856E−05 |
| $C_8$ | −1.0369E−05 | 6.9476E−06 | 3.1281E−06 | −1.5541E−05 |
| $C_{10}$ | 9.9968E−07 | −5.1297E−07 | 2.7801E−07 | 2.5029E−06 |
| $C_{12}$ | −4.6539E−08 | 2.8092E−08 | −4.7868E−09 | −1.1860E−07 |

Referring to FIGS. 6A to 6D, since the graphs shown in FIGS. 6A to 6D are respectively within the standard ranges, they may prove the projection lens 100' of the fourth embodiment not only has the small telecentric angle so as to be adapted to the telecentric system, but also has the compact size and lower cost in the condition of maintaining high imaging quality.

In summary, each of the above-mentioned embodiments of the present invention has at least one of the following advantages. The projection lens the embodiment of the present invention may use four lenses to correct the lateral color and the aberration, and achieve advantages of low distortion aberration, low keystone aberration, high FOV, and small telecentric angle (smaller than 1 degree). Therefore, the projection lens of the embodiment of the present invention has at least one of the following advantages of compact size, low cost, and high imaging quality.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection lens, comprising:
   a first lens group composed of a first lens, the first lens having a concave surface and a convex surface, and the convex surface facing a reducing side of the projection lens;
   a second lens group having positive refractive power and comprising a second lens having positive refractive power and a third lens having negative refractive power, the second lens being located between the first lens and the third lens, the second lens being a biconvex lens, and the third lens having a concave surface facing the reducing side;
   a third lens group composed of a fourth lens having positive refractive power, the third lens being located between the second lens and the fourth lens, and the fourth lens having a convex surface facing a magnifying side of the projection lens, wherein the first lens group, the second lens group, and the third lens group comprise at least two aspheric lenses; and
   an aperture stop disposed between the first lens and the second lens.

2. The projection lens as claimed in claim 1, wherein the first lens group, the second lens group, and the aperture stop constitute a simultaneous focus group, and the third lens group is fixed.

3. The projection lens as claimed in claim 1, wherein R6 represents a radius of curvature of a surface of the third lens facing the magnifying side, R7 represents a radius of curvature of the concave surface of the third lens facing the reducing side, and the projection lens satisfies an inequality of $0.7 \leq (|R6|+R7)/(|R6|-R7) \leq 2$.

4. The projection lens as claimed in claim 1, wherein an imaging surface is located at the reducing side of the projection lens, D represents a distance from a center of the concave surface of the first lens to the imaging surface, F represents an effective focal length of the projection lens, and the projection lens satisfies an inequality of $1 \leq D/F \leq 2.5$.

5. The projection lens as claimed in claim 1, wherein FG1 represents an effective focal length of the first lens group, FL2 represents an effective focal length of the second lens, and the projection lens satisfies an inequality of $1.8 \leq |FG1|/FL2 \leq 11$.

6. The projection lens as claimed in claim 1, wherein R7 represents a radius of curvature of the concave surface of the third lens facing the reducing side, F represents an effective focal length of the projection lens, and the projection lens satisfies an inequality of $0.2 \leq R7/F \leq 1$.

7. The projection lens as claimed in claim 1, wherein FG1 represents an effective focal length of the first lens group, F represents an effective focal length of the projection lens, and the projection lens satisfies an inequality of $1.5 \leq |FG1|/F \leq 8$.

8. The projection lens as claimed in claim 1, wherein FG2 represents an effective focal length of the second lens group, FG3 represents an effective focal length of the third lens group, and the projection lens satisfies an inequality of $0.2 \leq FG2/FG3 \leq 1.8$.

9. The projection lens as claimed in claim 1, wherein FG3 represents an effective focal length of the third lens group, F represents an effective focal length of the projection lens, and the projection lens satisfies an inequality of $0.8 \leq FG3/F \leq 2$.

10. The projection lens as claimed in claim 1, wherein the second lens group further comprises a fifth lens having positive refractive power, and the fifth lens is disposed between the second lens and the third lens.

11. The projection lens as claimed in claim 10, wherein the fifth lens is a meniscus lens having a convex surface facing the magnifying side.

12. The projection lens as claimed in claim 10, wherein FG1 represents an effective focal length of the first lens group, FL25 represents an effective focal length of a combination of the second lens and the fifth lens, and the projection lens satisfies an inequality of $1.8 \leq |FG1|/FL25 \leq 11$.

13. The projection lens as claimed in claim 10, wherein the first lens and the fifth lens are aspheric lenses.

14. The projection lens as claimed in claim 10, wherein the first lens has negative refractive power.

15. The projection lens as claimed in claim 1, wherein the first lens and the second lens are aspheric lenses.

16. The projection lens as claimed in claim 1, wherein the first lens and the third lens are aspheric lenses.

17. The projection lens as claimed in claim 1, wherein the first lens has negative refractive power.

18. The projection lens as claimed in claim 1, wherein the first lens is adapted to let light beams passing through the first lens deviate from an optical axis of the projection lens.

* * * * *